US008255922B1

(12) United States Patent
Fresko et al.

(10) Patent No.: US 8,255,922 B1
(45) Date of Patent: Aug. 28, 2012

(54) MECHANISM FOR ENABLING MULTIPLE PROCESSES TO SHARE PHYSICAL MEMORY

(75) Inventors: Nedim Fresko, San Francisco, CA (US); Jiangli Zhou, San Jose, CA (US); Dean R. E. Long, Boulder Creek, CA (US)

(73) Assignee: Oracle America, Inc., Redwood City, CA (US)

( * ) Notice: Subject to any disclaimer, the term of this patent is extended or adjusted under 35 U.S.C. 154(b) by 1765 days.

(21) Appl. No.: 11/328,965

(22) Filed: Jan. 9, 2006

(51) Int. Cl.
*G06F 3/00* (2006.01)
*G06F 9/44* (2006.01)
*G06F 9/46* (2006.01)
*G06F 13/00* (2006.01)
*G06F 15/167* (2006.01)

(52) U.S. Cl. ........ 719/312; 709/213; 709/214; 709/215; 709/216

(58) Field of Classification Search .................. None
See application file for complete search history.

(56) References Cited

U.S. PATENT DOCUMENTS

| | | | | |
|---|---|---|---|---|
| 6,546,546 B1 * | 4/2003 | Van Doorn | ..................... | 717/114 |
| 6,694,346 B1 * | 2/2004 | Aman et al. | ................... | 718/104 |
| 6,738,977 B1 * | 5/2004 | Berry et al. | ..................... | 719/332 |
| 6,845,437 B2 * | 1/2005 | Borman et al. | ................ | 711/173 |
| 6,973,646 B1 * | 12/2005 | Bordawekar et al. | ......... | 717/146 |
| 7,574,705 B2 * | 8/2009 | Taivalsaari et al. | ............ | 717/162 |
| 2003/0217092 A1 * | 11/2003 | Veselov | ......................... | 709/106 |
| 2003/0217248 A1 * | 11/2003 | Nohl et al. | ..................... | 712/208 |
| 2004/0054994 A1 * | 3/2004 | Demsey et al. | ............... | 717/148 |
| 2005/0183077 A1 * | 8/2005 | Langdale et al. | .............. | 717/148 |
| 2005/0223005 A1 * | 10/2005 | Shultz et al. | ....................... | 707/8 |
| 2005/0262512 A1 * | 11/2005 | Schmidt et al. | ................ | 719/310 |
| 2005/0278790 A1 * | 12/2005 | Birk et al. | ........................ | 726/26 |
| 2006/0190932 A1 * | 8/2006 | Gilbert | ........................... | 717/140 |

OTHER PUBLICATIONS

Joisha et al. A Framework for Efficient Reuse of Binary Code. Proceedings of the 15th international conference on Supercomputing [online] (Jun. 21, 2001). ACM, pp. 440-453. Retrieved From the Internet <http://portal.acm.org/citation.cfm?id=377792.377902>.*

(Continued)

*Primary Examiner* — Emerson Puente
*Assistant Examiner* — Jonathan R Labud
(74) *Attorney, Agent, or Firm* — Osha Liang LLP

(57) ABSTRACT

A mechanism is disclosed for enabling multiple processes to share the same portion of physical memory. The first time an instance of a process is executed, a list of common components is compiled. The compiled code is then written into a newly created mappable data structure, which is stored into persistent storage. The next time an instance of that process is executed, the mappable data structure is mapped into a portion of the process instance's virtual memory space. This enables the process instance to invoke the compiled code for the common components. Multiple instances of the process may have their virtual memory spaces mapped to the same mappable data structure in this way. Thereafter, it is up to the operating system to load the contents of the mappable data structure into a portion of physical memory, and to ensure that all of the process instances share that physical memory portion.

19 Claims, 8 Drawing Sheets

OTHER PUBLICATIONS

Noble, Seth B., "Memory Mangement-How Much Memory,?" UNIX Memory Management, located on the internet at <http://dataexpedition.com/~sbnoble/Tips/memory.html>, retrieved on May 3, 2006, 5 pages.

Vandry, Phillip, "Solaris Shared Library FAQ," Nov. 20, 1995, located on the internet at <http://www.tzone.org/~vandry/shared-lib>, retrieved on May 30, 2006, 8 pages.

Wikipedia, "Library—Shared Library," located on the internet at <http://en.wikipedia.org?wiki/Shared_library#Shared_library>, retrieved on May 30, 2006 5 pages.

XEmacs, "Dumping," XEmacs Internals Manual, Chapter 39-Dumping, retrieved from the internet at http://666.com/xemacs-internals/internals_39.html, retrieved on May 30, 2006.

* cited by examiner

MECHANISM FOR ENABLING MULTIPLE PROCESSES TO SHARE PHYSICAL MEMORY

BACKGROUND

In a typical Java implementation, whenever a Java application is executed, an instance of a Java virtual machine (JVM) is also started to support the execution of the Java application. If x Java applications are run concurrently, there would be x JVM instances. Typically, each JVM instance is an independent process that is unaware of the other JVM's. As a result, the various JVM instances typically do not share anything with each other.

One of the structures managed by each JVM is a code cache. The code cache contains compiled code for the methods that have been compiled by that JVM. In Java, when a method has been executed repeatedly, the JVM compiles that method from Java bytecodes down to native code that can be executed by a processor (this compilation process is typically referred to as just-in-time or JIT compilation). By doing so, the JVM enables the method to be executed faster (rather than using a Java interpreter to execute the Java bytecodes of the method, the method is executed directly by the processor, which is faster). Once a method is compiled, the compiled code for that method is inserted into the code cache for that JVM. The JVM thereafter executes the method by accessing its code cache.

The code cache of a JVM occupies a portion of the JVM's virtual memory space. This portion of the JVM's virtual memory space is mapped by the operating system to a portion of physical memory. It is in the physical memory where the compiled code for the code cache is actually stored. As noted above, a JVM instance typically does not share anything with other JVM instances. As a result, the compiled code in the code caches of different JVM's is typically stored in different portions of physical memory. For example, the compiled code for the code cache of JVM 1 may be stored in a first portion of physical memory, while the compiled code for the code cache of JVM 2 may be stored in a different portion of physical memory.

It has been observed that there are many common methods that are compiled by every JVM. These methods may be, for example, core JVM methods that are invoked over and over again by every JVM. Because each JVM manages its own code cache, and because each code cache is mapped to a different portion of physical memory, there are multiple copies of the compiled code for the common methods residing in different portions of physical memory. This redundancy leads to an unnecessary and wasteful consumption of the physical memory. In implementations where physical memory is quite limited (e.g. personal digital assistants, cellular phones, etc.), this inefficiency can be a significant problem. To optimize efficiency and performance, it would be better to store the compiled code for the common methods in only one portion of physical memory and have all of the JVM instances share (i.e. have their code caches map to) that same portion of physical memory.

One approach that has been implemented to enable multiple JVM instances to share the same physical memory portion is known as "cloning". With cloning, a master JVM is first instantiated. The master JVM then compiles a list of common methods and inserts the compiled code for these common methods into the master JVM's code cache. That code cache (more specifically, the virtual memory range that makes up the code cache) is then mapped by the operating system to a portion of physical memory, and the compiled code for the common methods is stored into that portion of physical memory. Then, one or more "clones" of the master JVM are made (this may be done, for example, by using a "fork" instruction in Unix). Created in this way, each clone is still an independent JVM instance, but the code caches of all of the clones will be mapped to the portion of physical memory in which the compiled code for the common methods is already stored. In this way, the code caches of the master JVM and the JVM clones will all share the same portion of physical memory.

While cloning does enable multiple JVM's to share the same physical memory portion, it does have some significant drawbacks. One of the drawbacks is that cloning is operating system dependent. Only a few operating systems, such as Unix, have a "fork" or equivalent instruction. Thus, cloning can be implemented only on those operating systems. Another drawback is that cloning requires the master JVM to compile the common methods every time the master JVM is instantiated. If the list of common methods is relatively long, this compilation process may take a significant amount of time to carry out. This in turn will slow down execution and performance. For these and other reasons, cloning is not a wholly satisfactory method for enabling JVM's to share physical memory.

SUMMARY

In accordance with one embodiment of the present invention, there is provided an improved mechanism for enabling multiple processes (e.g. multiple JVM instances) to share the same portion of physical memory. According to this mechanism, the first time a set of code (e.g. a set of JVM code) is executed to give rise to a process instance, a list of common components (e.g. common Java methods) is compiled to derive the compiled code for the common components. The compiled code is then written into a newly created mappable data structure (such as a file, for example), and the mappable data structure is stored into a persistent storage for subsequent access. The next time (and all subsequent times thereafter) that set of code is executed to give rise to a process instance, the common components will not be recompiled. Instead, it will be determined that the mappable data structure already exists in the persistent storage, and the mappable data structure will be mapped into a portion of the process instance's virtual memory space (e.g. the process instance's code cache). Doing so will enable the process instance to invoke the compiled code for the common components. The set of code may be executed multiple times concurrently to give rise to multiple process instances, and each process instance will have a portion of its virtual memory space mapped to the mappable data structure in this way.

When each of the process instances accesses its virtual memory space to invoke the compiled code for one of the common components for the first time, an underlying operating system detects this invocation. Realizing that this portion of the process instance's virtual memory space is mapped to the mappable data structure (which is stored in persistent storage), the operating system checks to see if the contents of the mappable data structure have already been loaded from the persistent storage into physical memory. If the contents have not been loaded into physical memory, then the operating system will load the contents into a portion of physical memory, and will map the portion of the process instance's virtual memory space to that portion of physical memory. On the other hand, if the contents of the mappable data structure have already been loaded into a portion of physical memory, then the operating system will not load the contents of the mappable data structure into another portion of physical memory. Rather, the operating system will map the portion of the process instance's virtual memory space to the portion of physical memory into which the contents of the mappable data structure have already been loaded. By doing this, the operating system ensures that, if multiple process instances are concurrently executing, all of those process instances will have a portion of their virtual memory space mapped to the same portion of physical memory. In this manner, the multiple process instances are able to share the same portion of physical memory.

DETAILED DESCRIPTION OF EMBODIMENT(S)

Apparatus Overview

Figure 1:
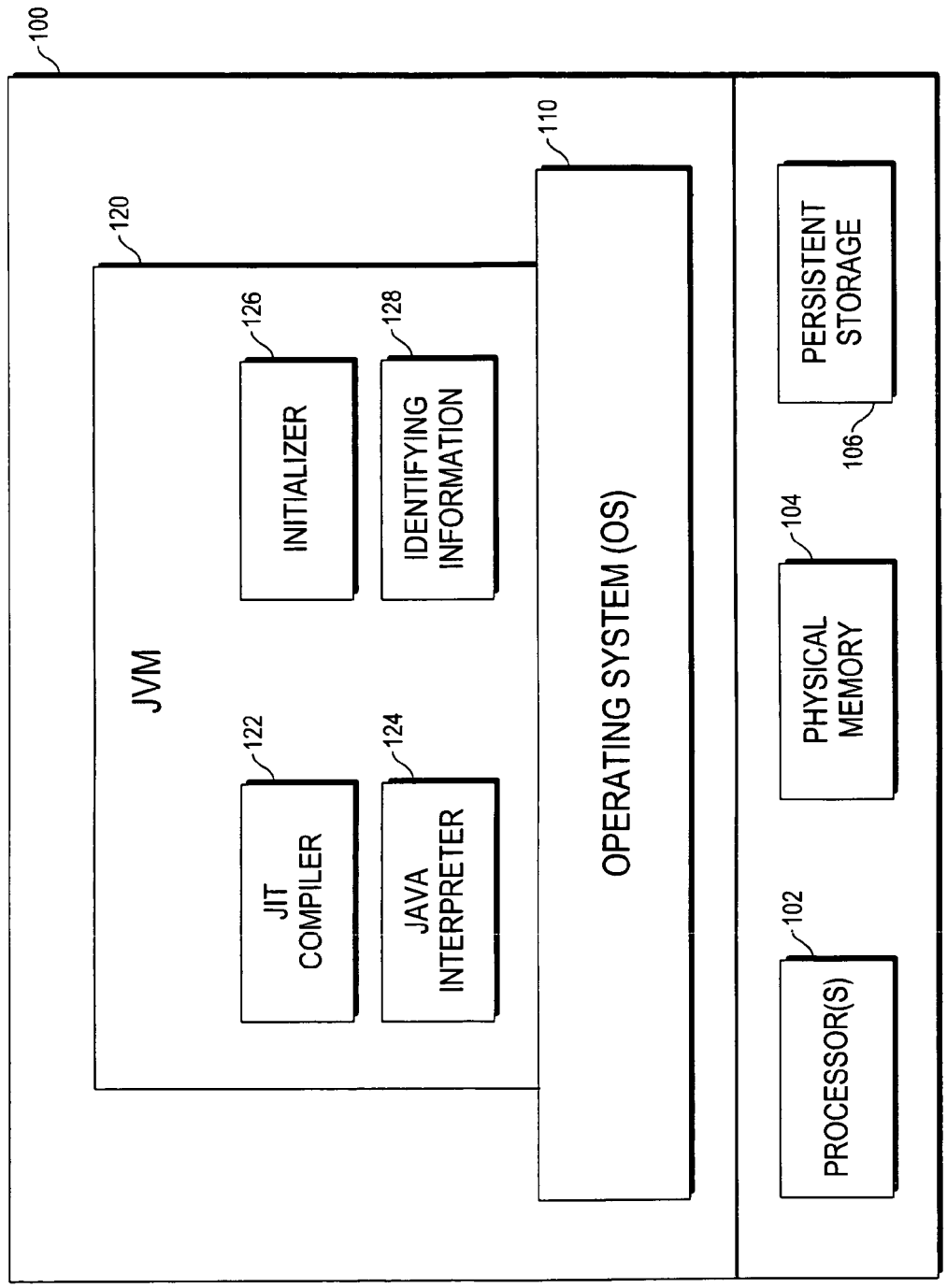
FIG. 1 is a functional block diagram of an apparatus in which one embodiment of the present invention may be implemented.

With reference to FIG. 1, there is shown a functional block diagram of an apparatus 100 in which one embodiment of the present invention may be implemented. For the sake of illustration, an embodiment of the present invention will be described with reference to a JVM. It should be noted, though, that the invention is not so limited. Rather, the concepts taught herein may be applied generally to any type of process in which it is desirable for multiple instances of the process to share physical memory. For purposes of the present invention, the apparatus 100 may be any type of computing device, including but not limited to handheld computing devices (e.g. personal digital assistants), mobile phones, portable computers, personal computers, server computers, etc.

As shown, the apparatus 100 comprises a set of one or more processors 102, physical memory 104, and persistent storage 106. For purposes of the present invention, the processor(s) 102 may be any type of processor capable of executing computer code, the physical memory 104 may be any type of read/write memory (e.g. volatile RAM, flash memory, etc.), and the persistent storage 106 may be any type of nonvolatile storage (e.g. magnetic media, flash memory, optical media, etc.) that does not lose its data when the apparatus 100 is turned off.

The apparatus 100 further comprises a set of code 110 that constitutes an operating system, and a set of code 120 that constitutes a JVM. The apparatus 100 may further comprise other sets of code (not shown) that constitute one or more Java applications. The operating system code 110, when executed by the processor(s) 102, provides the underlying platform for supporting all of the programs that are executed on the apparatus 100, and the JVM code 120, when executed, provides the platform for supporting the execution of the Java applications. For purposes of the present invention, the operating system 110 may be any type of operating system, including but not limited to Solaris, Unix, Linux, Windows, DOS, and MacOs. The operating system code 110, the JVM code 120, and other code and data may be maintained in a file system that is stored within the persistent storage 106.

The JVM code 120 comprises a JIT compiler 122 and a Java interpreter 124. In Java, a method of a Java class may be executed in one of two ways. First, a method may be executed interpretively. When a method is executed interpretively, the Java interpreter 124 is invoked to interpret and to execute the Java bytecodes that make up the method. As an alternative, a Java method may be executed natively. To do so, the JIT compiler 122 is invoked to compile the bytecodes of the method down to native executable code. The native code is then executed directly by the processor(s) 102.

In addition to the JIT compiler 122 and the Java interpreter 124, the JVM code 120, in one embodiment, further comprises an initializer 126. When the JVM code 120 is executed, it is the initializer 126 that performs many of the tasks needed to prepare the JVM instance for operation. As will be explained further in a later section, these tasks include tasks implemented for purposes of enabling multiple JVM instances to share physical memory.

In one embodiment, the JVM code 120 has a set of identifying information 128 associated therewith. The set of identifying information 128 comprises information that uniquely or semi-uniquely identifies the JVM code 120. The identifying information may be as simple as a version number or any other number that identifies the JVM code 120. It may also be as sophisticated as a binary signature of the JVM code 120. This binary signature may be derived, for example, by processing the JVM code 120 through a hashing algorithm and deriving a hash code therefrom. This hash code can be used to identify the JVM code 120. If the JVM code 120 is changed in any way, the hash code generated by processing the JVM code 120 through the same hashing algorithm would most likely be different. Thus, the hash code can be used to differentiate one version of the JVM code 120 from another. The significance and use of this identifying information 128 will be elaborated upon in a later section. For purposes of the present invention, any information that uniquely or semi-uniquely identifies the JVM code 120 may be used as the identifying information 128. In one embodiment, the identifying information 128 is determined at the time the JVM code 120 is built (i.e. at "build time"), and is provided with the JVM code 120 (either embedded within the JVM code 120 or as additional information).

In operation, the processor(s) 102 execute the operating system code 110 to provide an overall operating platform or environment. The processor(s) 102 may also execute the JVM code 120 one or more times to support the execution of one or more Java applications. Each time the JVM code 120 is executed, it gives rise to a JVM instance. Thus, if the JVM code 120 is executed multiple times concurrently, then there would be multiple concurrent JVM instances. Executed in this way, each JVM instance would be its own process having its own process space. Put another way, each JVM instance would have its own virtual memory space. Because each JVM instance is its own process, each instance is generally unaware of the presence of the other JVM instances. As noted previously, different JVM instances generally do not share anything between them. To enable sharing (for example, of physical memory), some additional operations need to be performed. These operations, in accordance with one embodiment of the present invention, will now be described with reference to an example.

Execution of Initial Process Instance

Figure 2:
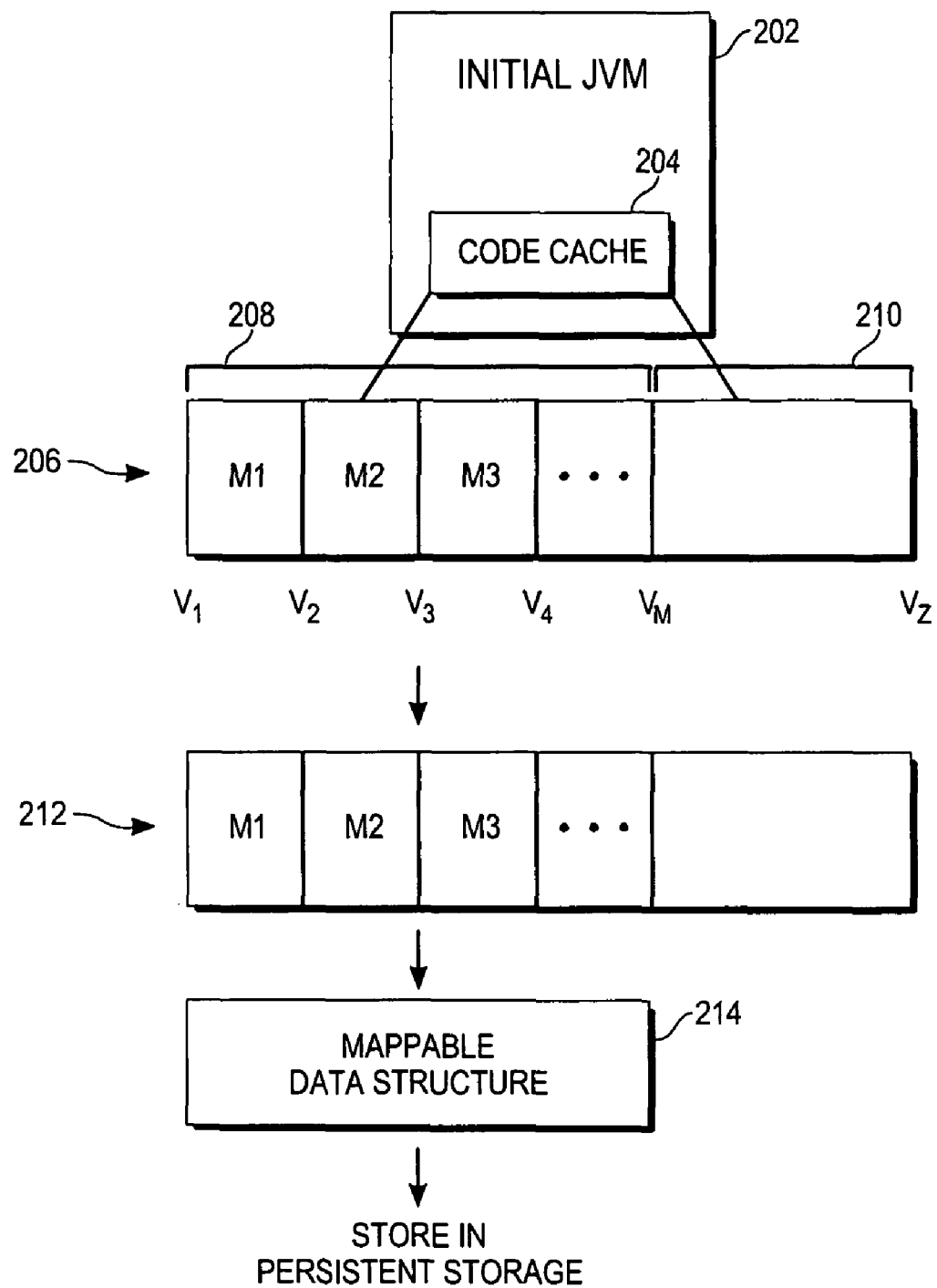
FIG. 2 is a functional block diagram showing the mapping between a code cache, a portion of virtual address space, a portion of physical address space, and a mappable data structure, in accordance with one embodiment of the present invention.
Figure 3:
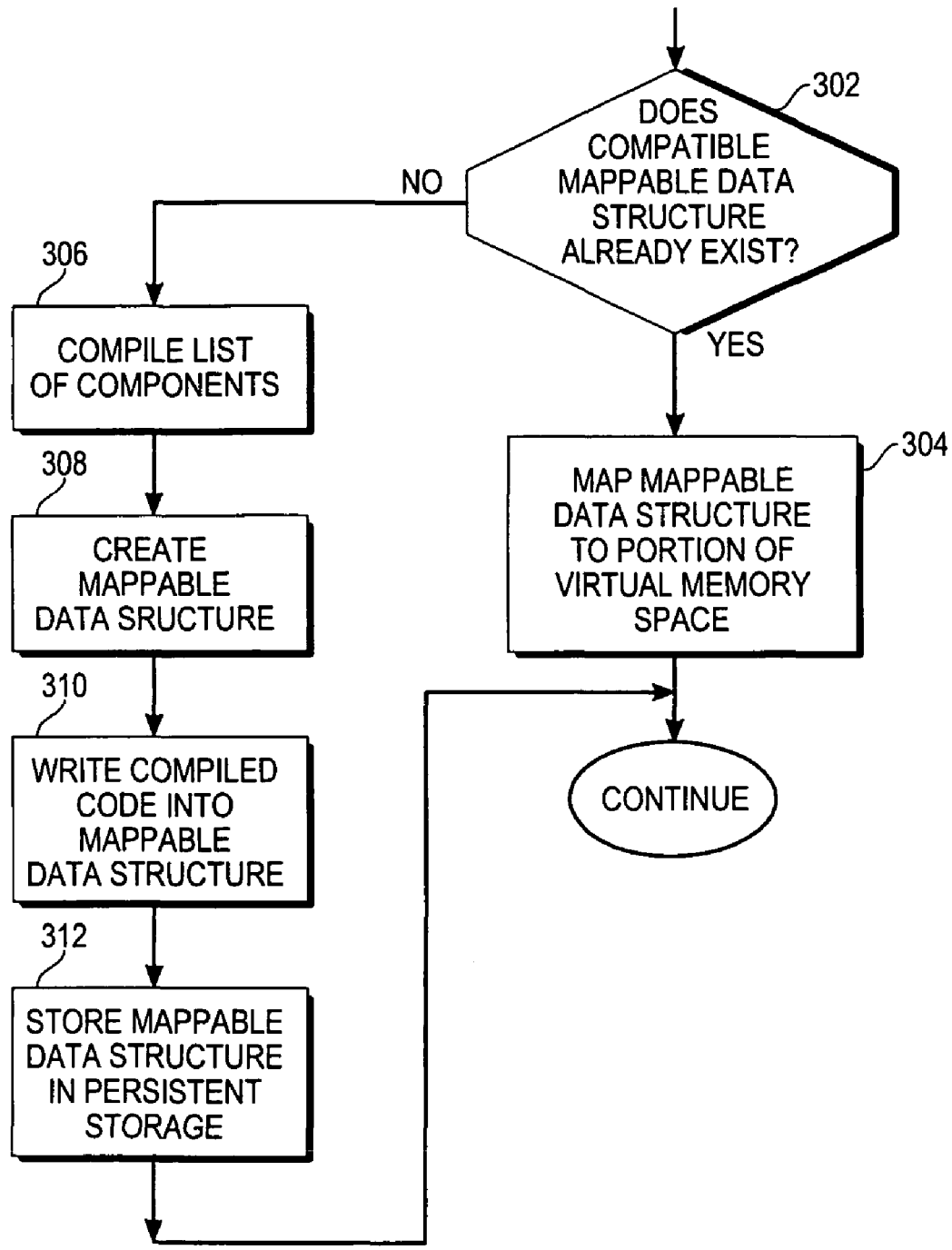
FIG. 3 is a flow diagram illustrating the operation of a process initializer, in accordance with one embodiment of the present invention.

Suppose for the sake of illustration that JVM code 120 has been loaded onto apparatus 100, but has never been executed. Suppose further that the JVM code 120 is now executed by the processor(s) 102 for the very first time on the apparatus 100. This execution gives rise to an initial JVM instance 202, as shown in FIG. 2 (note: in one embodiment, an assumption is made that each time the JVM code 120 is loaded for execution, it is always loaded at the same virtual address). When this JVM instance 202 is executed, the initializer 126 is invoked to initialize the JVM instance 202 to prepare it for normal operation. As part of this preparation process, the initializer 126 performs a variety of operations. Some of these operations are performed for purposes of enabling different JVM instances to share physical memory. One embodiment of these operations is shown in the flow diagram of FIG. 3.

In one embodiment, one of the tasks performed by the initializer 126 is to initialize a code cache 204 for the JVM instance 202. In one embodiment, the code cache 204 occupies a portion 206 of the JVM instance's virtual memory space. To initialize the code cache 204, the initializer 126 assigns a predetermined virtual address range to the code cache 204. As shown in FIG. 2, this virtual address range ranges from virtual memory address V1 to virtual memory address Vz (where V1 and Vz may be any desired virtual memory addresses). In one embodiment, the predetermined virtual address range is in a virtual address region that is not used by the operating system 110 for any of its conventions (e.g. program loading, shared library loading, native heap, native stacks, etc.).

After the code cache 204 is initialized, the initializer 126, in one embodiment, determines (block 302 of FIG. 3) whether a mappable data structure compatible with the JVM instance 202 already exists in the persistent storage 106. The particulars of this determination will be discussed in greater detail in a later section, but for now, since this is the first time the JVM code 120 is executed on the apparatus 100, it is assumed that there is no such existing data structure. Thus, the initializer 126 proceeds to block 306 to compile a list of common components. These common components may be, for example, common Java methods that are typically invoked repeatedly by many or all JVM's.

In one embodiment, to carry out this compilation operation, the initializer 126 requests a physical memory allocation from the operating system 110, and instructs the operating system 110 to map this physical memory to the virtual memory addresses of the code cache 204. In one embodiment, the size of this requested memory allocation is the same as the size of the code cache, which, in this example, would be Vz-V1 (as an alternative, the initializer 126 may request smaller chunks of physical memory and instruct the operating system 110 to map each of those chunks to certain portions of the virtual memory space; hence, the physical memory need not be contiguous). In response to the allocation request, the operating system 110 allocates an appropriate portion 212 of physical memory (this portion 212 of physical memory is a portion of the physical memory 104 shown in FIG. 1), and maps this portion 212 to the portion 206 of virtual memory space assigned to the code cache 204. In this manner, virtual addresses V1 through Vz are mapped to physical memory portion 212.

Thereafter, the initializer 126 accesses a specific data structure (e.g. a file) in the persistent storage 106. This data structure may be stored at a specific path name in the file system, and this path name may be programmed into the JVM code 120 so that the JMV process 202 knows where to find the data structure. This data structure, which may be created and maintained by an administrator, contains a list of all of the common components that the initializer 126 should compile. After accessing the data structure, the initializer 126 iterates through the list of components, and compiles each component. To compile a component, the initializer 126 invokes the JIT compiler 122. In response, the JIT compiler 122 generates the compiled code for that component. As the compiled code for each component is generated, it is stored into the code cache 204. This in turn causes the compiled code to be stored into the portion 206 of the virtual memory space that corresponds to the code cache 204, and into the portion 212 of the physical memory 104 that corresponds to that portion 206 of virtual memory space. As shown in the example of FIG. 2, the compiled code for methods M1, M2, M3, etc. are stored into portions 206, 212. In one embodiment, as each set of compiled code is stored into the code cache 204, the initializer 126 notes the name of the component to which that compiled code corresponds, and the virtual memory address in portion 206 at which the compiled code starts. In the example of FIG. 2, the initializer 126 notes that the compiled code for method M1 starts at virtual memory address V1, the compiled code for method M2 starts at virtual memory address V2, the compiled code for method M3 starts at virtual memory address V3, and so forth. After all of the components on the list have been compiled, the initializer 126 provides information pertaining to the code cache 204 to the JVM instance 202. In one embodiment, this information includes: (1) the address range (e.g. V1 to Vz) of the entire code cache 204; (2) the address range (e.g. V1 to Vm) within the code cache which has already been used to store compiled code; and (3) component reference information (which includes the name of each compiled component and a reference or pointer (e.g. the virtual address) to the starting virtual address of the compiled code for that component). Given this information, the JVM instance 202 may thereafter use the code cache to invoke the compiled code for the compiled components.

After the common components are compiled, the initializer 126 proceeds to create (block 308) a new mappable data structure 214, and to write (block 310) the compiled code from the physical memory portion 212 into the mappable data structure 214. These operations may be carried out by making one or more calls to the operating system 110. For purposes of the present invention, the mappable data structure 214 may be any data structure (e.g. a file) that can be mapped to a portion of a process's virtual memory space. In the current example, the virtual memory space portion 206 has been filled from virtual memory address V1 to virtual memory address Vm with compiled code. The actual compiled code corresponding to this virtual address range is stored in the mappable data structure 214 (hence, the mappable data structure 214 is approximately Vm-V1 in size).

Thereafter, the initializer 126 stores (block 312) the mappable data structure 214 into the persistent storage 106. Again, this may be achieved by making one or more calls to the operating system 110. In one embodiment, the mappable data structure 214 is stored into the persistent storage 106 at a predetermined path name, which is programmed into the JVM code 120. Because this path name is programmed into the JVM code 120, each JVM instance will know where to find this mappable data structure 214. In one embodiment, as part of this storing process, the initializer 126 obtains the identifying information 128 associated with the JVM code 120, and associates this information with the mappable data structure 214 (this association may be made, for example, by tagging the mappable data structure 214 with the identifying information 128, by incorporating the identifying information 128 into the mappable data structure 214, or by any other means). Doing so associates the mappable data structure 214 with the JVM code 120. Put another way, the identifying information 128 indicates that it was the JVM code 120 that created the mappable data structure 214. As will be explained in a later section, this information can be used to determine whether the mappable data structure 214 is compatible with a later-executed JVM instance.

After the initializer 126 stores the mappable data structure 214 into persistent storage 106, the initial JVM instance 202 may continue execution or it may terminate. In fact, the entire apparatus 100 may be shut down, if so desired. Since the mappable data structure 214 is stored in persistent storage, it can be accessed at any later time, even after the apparatus 100 has been shut down and restarted. In the manner described, the common components are compiled the very first time the JVM code 102 is executed on the apparatus 100, and the compiled code for the common components is stored into persistent storage 106 for subsequent access.

Mapping Multiple Code Caches to the Mappable Data Structure

Figure 4:
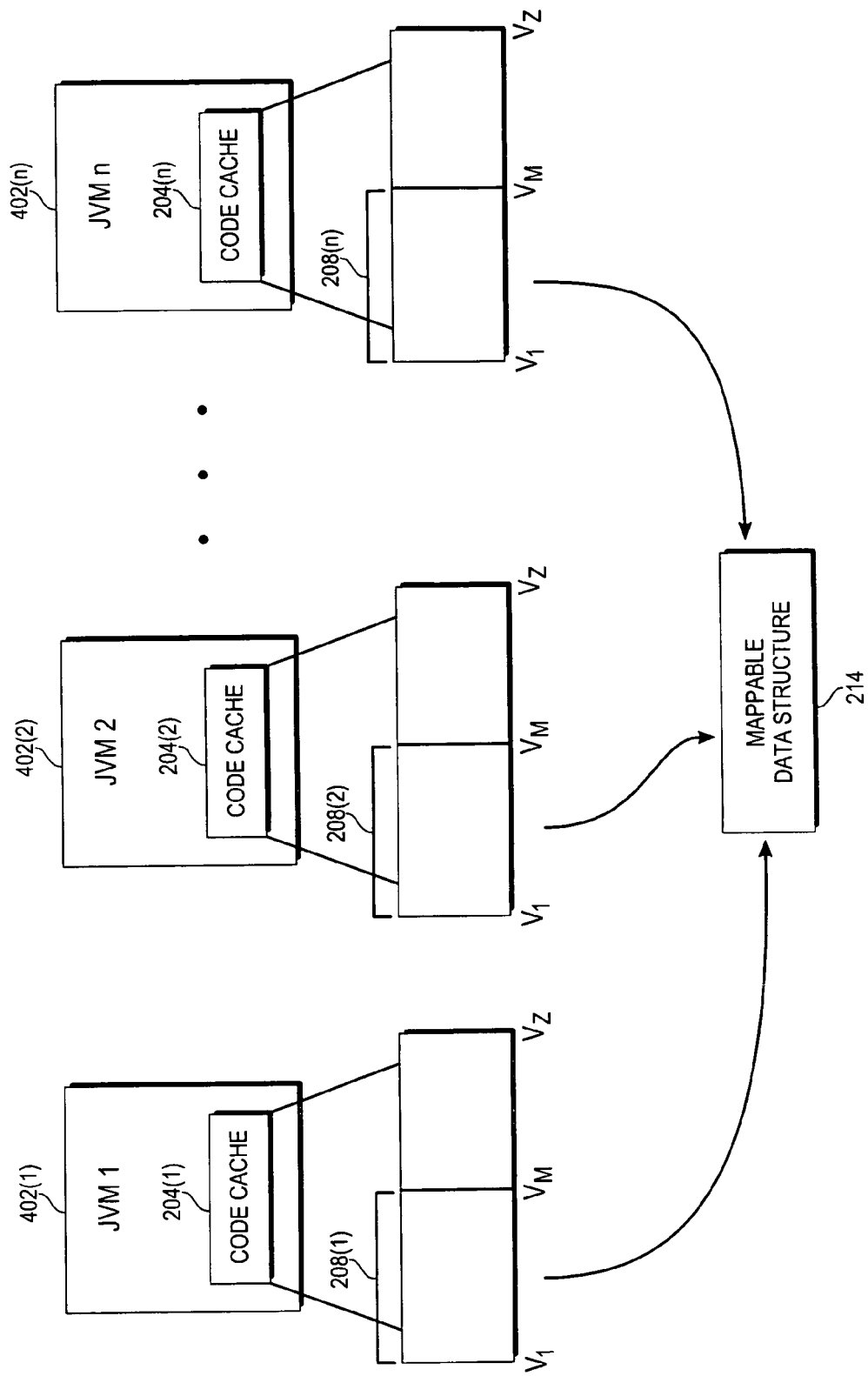
FIG. 4 is a functional block diagram showing the mapping between the virtual address spaces of a plurality of processes and a single mappable data structure, in accordance with one embodiment of the present invention.

Suppose now that at some later time, the processor(s) 102 execute the JVM code 120 again. This gives rise to another JVM instance. In FIG. 4, this JVM instance is shown as instance 402(1). When this instance 402(1) is started, the initializer 126 is invoked to prepare the instance 402(1) for operation. As described previously in connection with the initial JVM instance 202, one of the operations performed by the initializer 126 is to initialize a code cache 204(1) for the instance 402(1). To do so, the initializer 126 assigns a predetermined virtual address range to the code cache 204(1). In one embodiment, this virtual address range is the same as that previously described in connection with the initial JVM instance 202, namely, from virtual memory address V1 to virtual memory address Vz.

After the code cache 204(1) is initialized, the initializer 126 determines (block 302 of FIG. 3) whether a mappable data structure compatible with this instance 402(1) already exists in the persistent storage 106. To make this determination, the initializer 126 checks to see if a mappable data structure exists at the predetermined path name programmed into the JVM code 120. In the current example, since the initial JVM instance 202 created and stored the mappable data structure 214 into the persistent storage 106 at the predetermined path name, the initializer 126 should find the mappable data structure 214. Before it uses the mappable data structure 214, however, the initializer 126, in one embodiment, first determines whether the mappable data structure 214 is compatible with the JVM instance 402(1). In one embodiment, the initializer 126 makes this determination as follows. First, it obtains the identifying information 128 associated with the JVM code 120. Then, it obtains the identifying information associated with the mappable data structure 214 (recall that when the mappable data structure 214 was stored, a set of identifying information was associated therewith). The initializer 126 then compares these two sets of information to determine whether they match. If they do match, then it is known that the mappable data structure 214 was created by the same set of JVM code 120 as that used to give rise to instance 402(1); hence, it can be concluded that the mappable data structure 214 is compatible with the instance 402(1). On the other hand, if the two sets of information do not match, then it means that another set of JVM code created the mappable data structure 214. In such a case, the initializer 126 concludes that the mappable data structure 214 is not compatible with instance 402(1), and proceeds to blocks 306-312 to recompile the common components, and to create and store a new mappable data structure (this can be done in the same manner as that described above in connection with the initial JVM instance 202). By checking for compatibility in this way, the initializer 126 detects new versions of the JVM code 120 and recreates the mappable data structure to ensure compatibility and proper operation.

In the current example, the mappable data structure 214 is compatible with instance 402(1); thus, the initializer 126 uses the mappable data structure 214. To do so, the initializer 126 maps (block 304 of FIG. 3) the mappable data structure 214 to a portion 208(1) of the instance's virtual memory space. This portion 208(1) of the instance's virtual memory space (from virtual memory address V1 to virtual memory address Vm) corresponds to the size of the mappable data structure 214. This mapping may be achieved by making one or more mapping calls to the operating system 110. In this manner, the mappable data structure 214 is mapped into a portion of the instance's code cache 204(1).

Recall from previous discussion that, in one embodiment, whenever a JVM instance is started, the JVM code 120 is loaded at the same virtual address. This helps to facilitate the mapping of the mappable data structure 214 into the virtual memory space of a JVM instance. To elaborate, because the JVM code 120 is always loaded at the same virtual address, all data structures inside all JVM instances will remain at the same virtual addresses. Because of this, all virtual address pointers in the code stored in the mappable data structure 214 will be valid for all JVM instances (assuming of course that the mappable data structure 214 is compatible with the JVM instance). As a result, the mappable data structure 214 can be safely mapped into a JVM instance's virtual address space.

In one embodiment, in addition to mapping the mappable data structure 214 into a portion of the instance's code cache, the initializer 126 reads and processes the contents of the mappable data structure 214 to extract therefrom the names of the components that have been compiled. Also, given certain offsets set forth in the mappable data structure 214, the initializer 126 correlates the sets of compiled code in the mappable data structure 214 with the proper virtual memory addresses. For example, in the current example, the mappable data structure 214 contains compiled code for methods M1, M2, M3, etc. Based upon specified offsets, the initializer 126 determines that the compiled code for method M1 should start at virtual memory address V1, the compiled code for method M2 should start at virtual memory address V2, the compiled code for method M3 should start at virtual memory address V3, and so forth. After the initializer 126 determines the names of the compiled components and the references (e.g. pointers) to the virtual memory addresses at which the compiled code for these components start, the initializer 126 provides information pertaining to the code cache 204(1) to the JVM instance 402(1). In one embodiment, this information includes: (1) the address range (e.g. V1 to Vz) of the entire code cache 402(1); (2) the address range (e.g. V1 to Vm) within the code cache which has already been used to store compiled code; and (3) component reference information (which includes the name of each compiled component and a reference or pointer (e.g. the virtual address) to the starting virtual address of the compiled code for that component). Given this information, the JVM instance 402(1) may thereafter use the code cache 204(1) to invoke the compiled code for the compiled components. In this manner, the initializer 126 maps the mappable data structure 214 into a portion 208(1) of the instance's virtual memory space.

Suppose now that while instance 402(1) is running, the processor(s) 102 execute the JVM code 120 again, thereby giving rise to another JVM instance, shown as instance 402(2) in FIG. 4. When this instance 402(2) is started, the initializer 126 is invoked to prepare the instance 402(2) for operation. In the same manner as that described above in connection with instance 402(1), the initializer 126 initializes the code cache 204(2) for instance 402(2), and maps a portion 208(2) of it to the mappable data structure 214. Both instances 402(1), 402(2) now have a portion 208(1), 208(2) of their code cache 204(1), 204(2) mapped to the mappable data structure 214. The same process may be carried out to map a portion 208(n) of the code cache 204(n) of an nth instance 402(n) to the mappable data structure 214. In the manner described, multiple processes (e.g. multiple JVM instances) may have a portion of their code cache mapped to the same mappable data structure 214.

Physical Memory Sharing Among Multiple Processes

Thus far, the code caches of the JVM instances 402 are mapped to just a logical entity (the mappable data structure 214). None of the code caches are yet mapped to physical memory. To illustrate how the code caches may be mapped to and share physical memory, reference will now be made to the following example.

Figure 5:
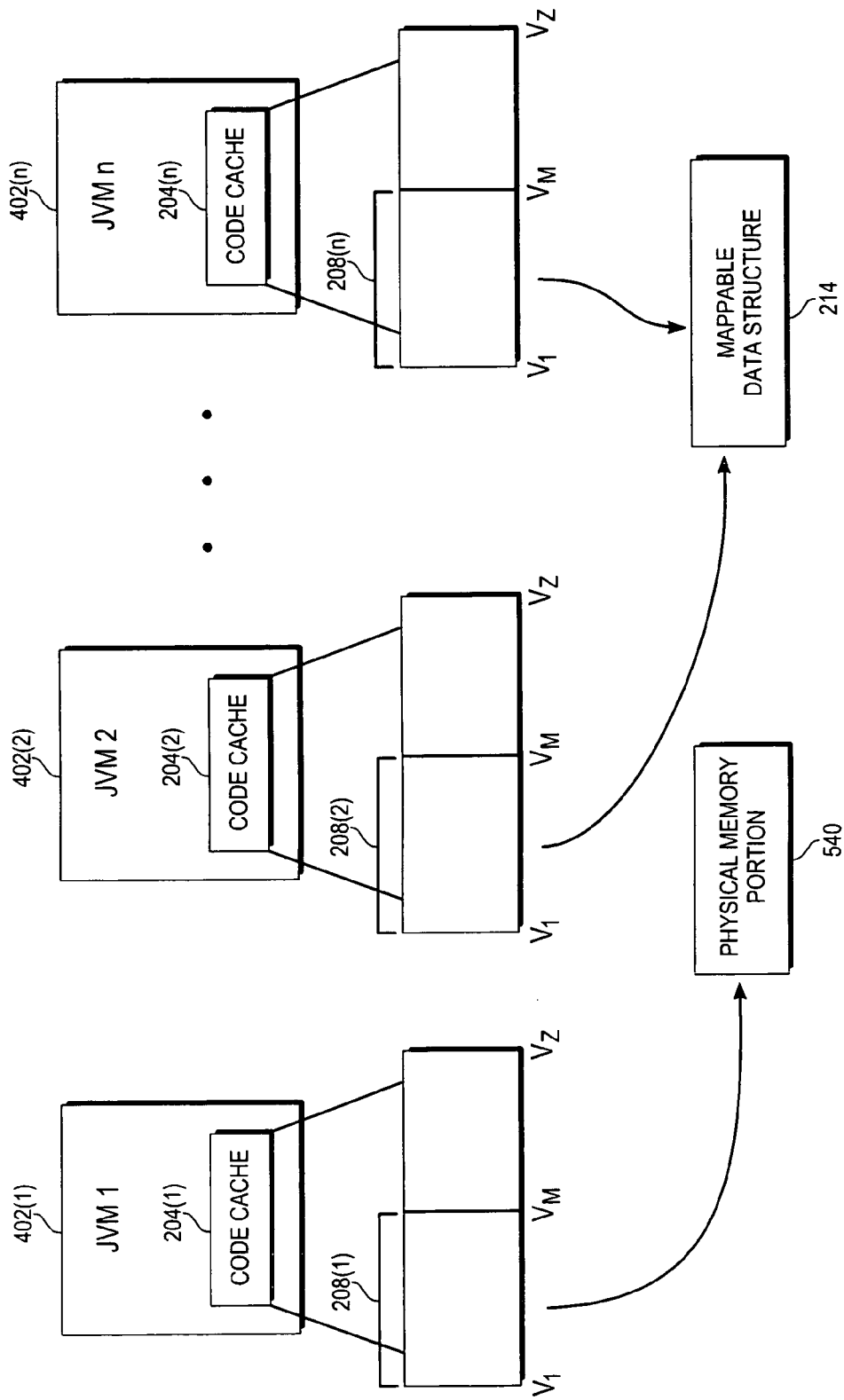
FIGS. 5-7 are functional block diagrams showing the mapping between the virtual address spaces of a plurality of processes and a single physical memory portion, in accordance with one embodiment of the present invention.

Suppose that JVM instance 402(1) accesses portion 208(1) of its code cache 204(1) to invoke the compiled code for one of the compiled components. When this access is made, the operating system 110 detects the access. As part of processing the access, the operating system 110 determines that that portion 208(1) of the instance's virtual memory space is currently mapped to a logical entity, namely, mappable data structure 214. The operating system 110 also knows that this logical entity is stored in persistent storage 106; hence, the operating system 110 knows that it may need to load the contents of the mappable data structure 214 from persistent storage 106 into a portion of the physical memory 104. Before it does so, however, the operating system 110 first determines whether the contents of the mappable data structure 214 have already been loaded into a portion of physical memory. If it has, then the operating system 110 will not reload the contents into another portion of physical memory. In the current example, however, the contents of the mappable data structure 214 have not yet been loaded into physical memory. Thus, the operating system 110 allocates a portion 540 (see FIG. 5) of physical memory 104, loads the contents of the mappable data structure 214 into that portion 540, and maps the portion 208(1) of the JVM instance's virtual memory space (a portion of code cache 204(1)) to that physical memory portion 540. Thereafter, accesses to portion 208(1) of code cache 204(1) will result in accesses to physical memory portion 540. At this point, only instance 402(1) is mapped to physical memory portion 540. Instances 402(2) and 402(n) are still mapped to the mappable data structure 214, as shown in FIG. 5.

Figure 6:
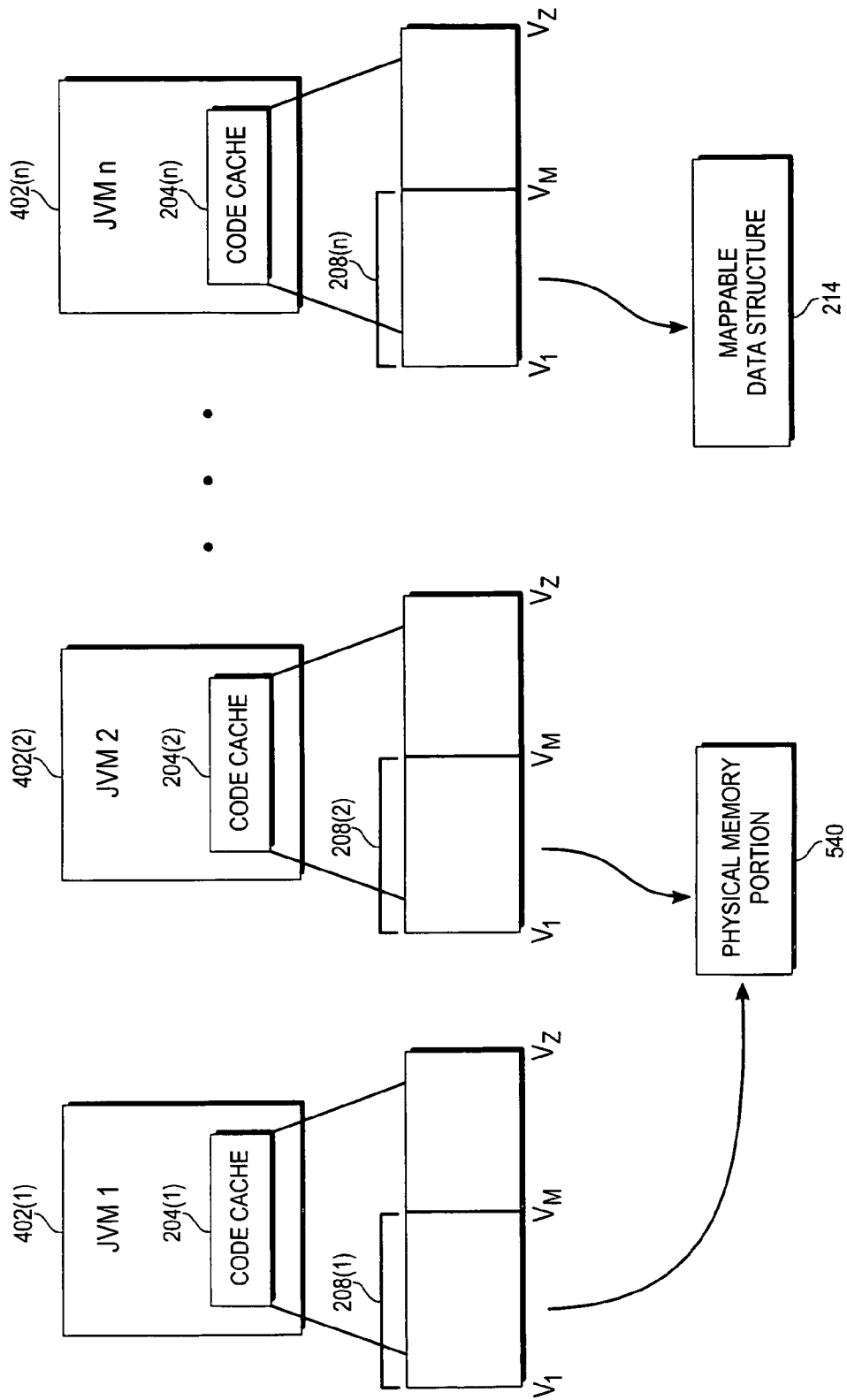

Suppose now that JVM instance 402(2) accesses portion 208(2) of its code cache 204(2) to invoke the compiled code for one of the compiled components. When this access is made, the operating system 110 detects the access. As part of processing the access, the operating system 110 determines that portion 208(2) of the instance's virtual memory space is currently mapped to a logical entity, namely, mappable data structure 214. The operating system 110 also knows that this logical entity is stored in persistent storage 106; hence, the operating system 110 knows that it may need to load the contents of the mappable data structure 214 from persistent storage 106 into a portion of the physical memory 104. Before it does so, however, the operating system 110 first determines whether the contents of the mappable data structure 214 have already been loaded into a portion of physical memory. In the current example, it has; thus, the operating system 110 will not reload the contents of the mappable data structure 214 into another portion of physical memory. Instead, the operating system 110 locates the portion 540 of physical memory into which the contents of the mappable data structure 214 have already been loaded. The operating system 110 then maps the portion 208(2) of the JVM instance's virtual memory space (a portion of code cache 204(2)) to that physical memory portion 540, as shown in FIG. 6. Thereafter, accesses to portion 208(2) of code cache 204(2) will result in accesses to physical memory portion 540. At this point, only instances 402(1) and 402(2) are mapped to physical memory portion 540. Instance 402(n) is still mapped to the mappable data structure 214.

Figure 7:
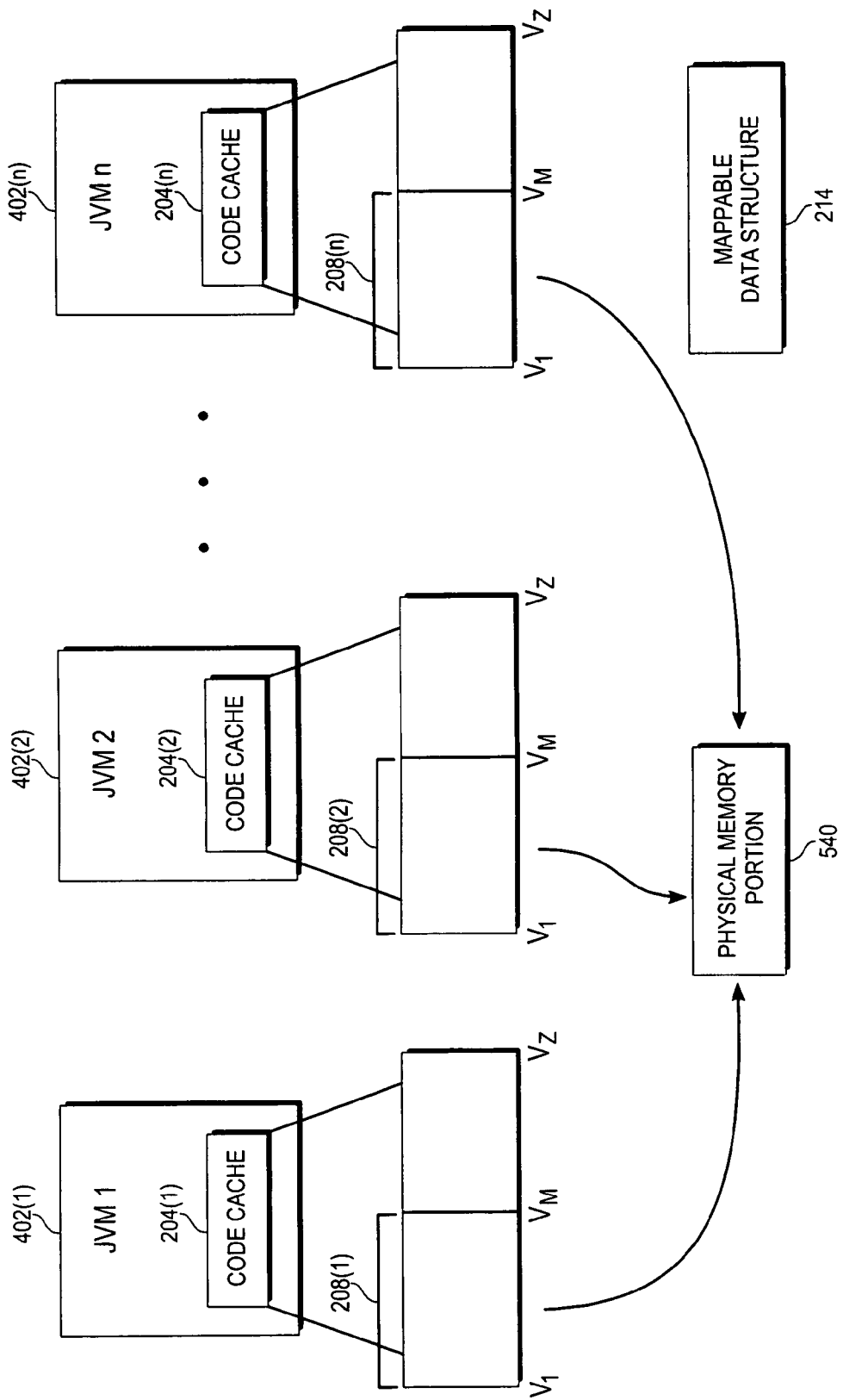

Suppose now that JVM instance 402(n) accesses portion 208(n) of its code cache 204(n) to invoke the compiled code for one of the compiled components. When this access is made, the operating system 110 detects the access. As part of processing the access, the operating system 110 determines that portion 208(n) of the instance's virtual memory space is currently mapped to a logical entity, namely, mappable data structure 214. The operating system 110 also knows that this logical entity is stored in persistent storage 106; hence, the operating system 110 knows that it may need to load the contents of the mappable data structure 214 from persistent storage 106 into a portion of the physical memory 104. Before it does so, however, the operating system 110 first determines whether the contents of the mappable data structure 214 have already been loaded into a portion of physical memory. In the current example, it has; thus, the operating system 110 does not reload the contents of the mappable data structure 214 into another portion of physical memory. Instead, the operating system 110 locates the portion 540 of physical memory into which the contents of the mappable data structure 214 have already been loaded. The operating system 110 then maps the portion 208(n) of the JVM instance's virtual memory space (a portion of code cache 204(n)) to that physical memory portion 540, as shown in FIG. 7. Thereafter, accesses to portion 208(n) of code cache 204(n) will result in accesses to physical memory portion 540. In this manner, all of the instances 402(1), 402(2), and 402(n) are made by the operating system 110 to share the physical memory portion 540. Notice that this sharing is transparent to the instances 402(1), 402(2), 402(n). The instances 402(1), 402(2), 402(n) are not aware that they are sharing physical memory portion 540, and they need not do anything additional to achieve the sharing. As a result, other than adding some functionality in the form of initializer 126, few if any changes need to be made to the general JVM code 120.

Hardware Overview

Figure 8:
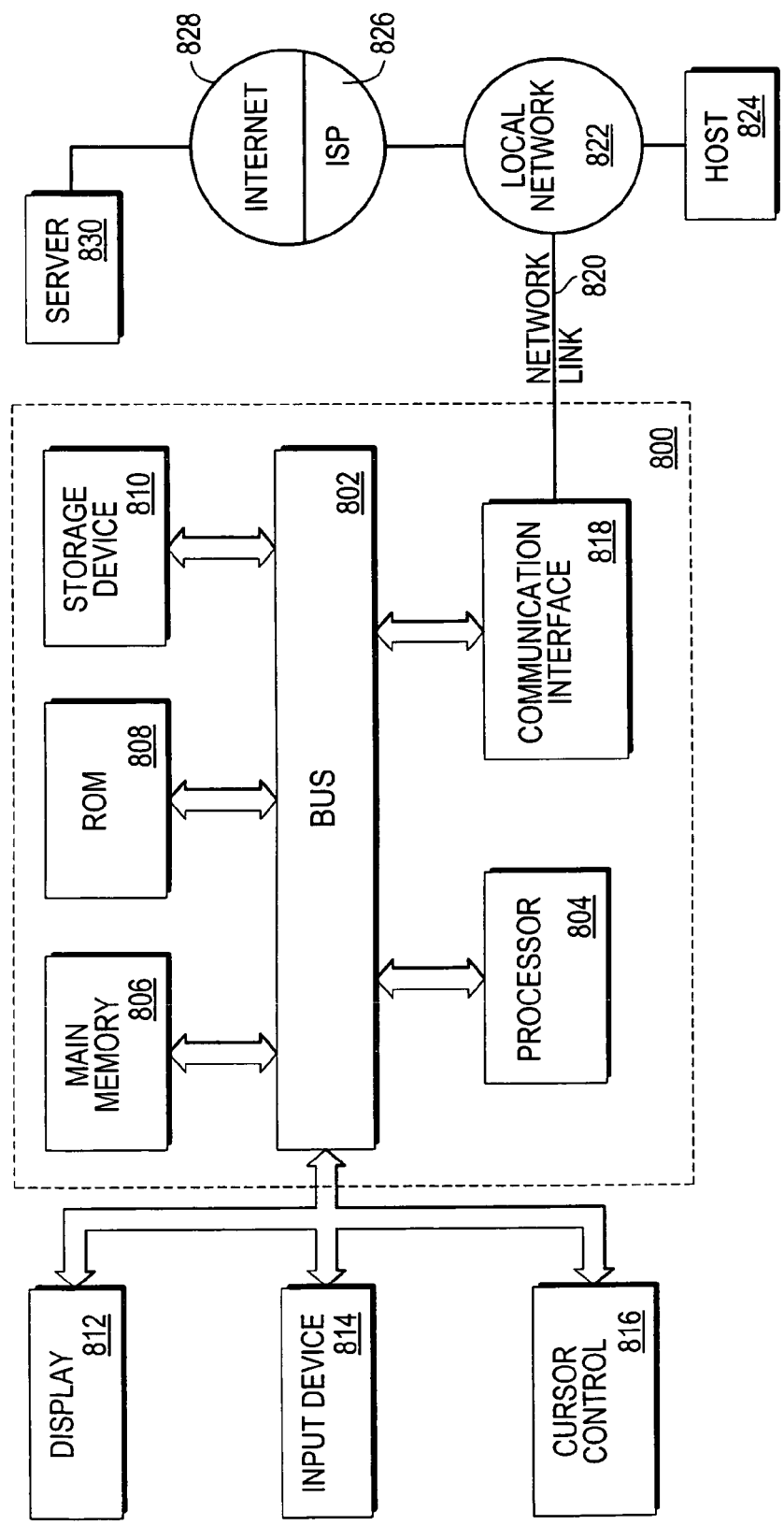
FIG. 8 is a block diagram of a general purpose computer system in which one embodiment of the present invention may be implemented.

In one embodiment, the operating system 110, JVM 120, JIT compiler 122, Java interpreter 124, and initializer 126 take the form of sets of instructions that are executed by one or more processors. FIG. 1 shows a simplified block diagram of an apparatus 100 on which these instructions may be executed. FIG. 8 shows one possible embodiment of the apparatus 100 in greater detail. Computer system 800 includes a bus 802 for facilitating information exchange, and one or more processors 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions by processor 804. Computer system 800 may further include a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812 for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

In computer system 800, bus 802 may be any mechanism and/or medium that enables information, signals, data, etc., to be exchanged between the various components. For example, bus 802 may be a set of conductors that carries electrical signals. Bus 802 may also be a wireless medium (e.g. air) that carries wireless signals between one or more of the components. Bus 802 may further be a network connection that connects one or more of the components. Any mechanism and/or medium that enables information, signals, data, etc., to be exchanged between the various components may be used as bus 802.

Bus 802 may also be a combination of these mechanisms/media. For example, processor 804 may communicate with storage device 810 wirelessly. In such a case, the bus 802, from the standpoint of processor 804 and storage device 810, would be a wireless medium, such as air. Further, processor 804 may communicate with ROM 808 capacitively. Further, processor 804 may communicate with main memory 806 via a network connection. In this case, the bus 802 would be the network connection. Further, processor 804 may communicate with display 812 via a set of conductors. In this instance, the bus 802 would be the set of conductors. Thus, depending upon how the various components communicate with each other, bus 802 may take on different forms. Bus 802, as shown in FIG. 8, functionally represents all of the mechanisms and/or media that enable information, signals, data, etc., to be exchanged between the various components.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, hard disk, magnetic tape, or any other magnetic storage medium, a CD-ROM, DVD, or any other optical storage medium, punchcards, papertape, any other physical storage medium with patterns of holes, a RAM, a PROM, and EPROM, a FLASH-EPROM, any other memory chip or cartridge, or any other storage medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method implemented by a computer, wherein a first process is executing on the computer, the method comprising:
    initializing, in response to executing a first virtual machine (VM) instance on the computer, a first code cache associated with the first VM instance, wherein the computer comprises a persistent storage, a first virtual memory space, and a physical memory;
    assigning the first virtual memory space to the first code cache;
    obtaining, from the first VM instance, a persistent storage location;
    determining that a mappable data structure does not exist at the persistent storage location;
    obtaining, in response to the determining that the mappable data structure does not exist, a first component associated with the first VM instance and a second component associated with the first VM instance;
    compiling the first component to obtain first compiled code stored in the first virtual memory space;
    compiling the second component to obtain second compiled code stored in the first virtual memory space;
    creating, at the persistent storage location, the mappable data structure;
    storing the first compiled code and the second compiled code in the mappable data structure;
    initializing, in response to executing a second virtual machine (VM) instance on the computer, a second code cache associated with the second VM instance, wherein the computer further comprises a second virtual memory space;
    assigning the second virtual memory space to the second code cache;
    obtaining, from the second VM instance, the persistent storage location;
    determining that the mappable data structure exists at the persistent storage location;
    determining that the mappable data structure is compatible with the second VM instance; and
    mapping, in response to the determining that the mappable data structure is compatible with the second VM instance, the mappable data structure into the second virtual memory space.

2. The method of claim 1, wherein determining that the mappable data structure is compatible with the second VM instance comprises:
    obtaining a first set of information associated with the mappable data structure;
    obtaining a second set of information associated with the second VM instance; and
    comparing the first set of information to the second set of information to obtain an indication that the mappable data structure is compatible with the second VM instance.

3. The method of claim 1, wherein storing the mappable data structure comprises:
    obtaining a set of information associated with the first VM instance; and
    storing the set of information with the mappable data structure.

4. The method of claim 1, further comprising:
    providing component reference information to the second VM instance to enable the second VM instance to invoke the first compiled code, wherein the component reference information includes information identifying the first component, and a reference to the first compiled code.

5. The method of claim 4, further comprising:
    processing the mappable data structure to derive the component reference information therefrom.

6. The method of claim 1, wherein the first VM instance is a Java virtual machine (JVM), and wherein the component-is a Java method.

7. The method of claim 1, wherein the first VM instance and second VM instance are created by executing the same set of code.

8. A machine readable storage medium comprising a set of instructions which, when executed by one or more processors, causes the one or more processors to perform the following operations:
    initializing, in response to executing a first virtual machine (VM) instance on the computer, a first code cache associated with the first VM instance, wherein the computer comprises a persistent storage, a first virtual memory space, and a physical memory;
    assigning the first virtual memory space to the first code cache;
    obtaining, from the first VM instance, a persistent storage location;
    determining that a mappable data structure does not exist at the persistent storage location;
    obtaining, in response to the determining that the mappable data structure does not exist, a first component associated with the first VM instance and a second component associated with the first VM instance;
    compiling the first component to obtain first compiled code stored in the first virtual memory space;
    compiling the second component to obtain second compiled code stored in the first virtual memory space;
    creating, at the persistent storage location, the mappable data structure;
    storing the first compiled code and the second compiled code in the mappable data structure;
    initializing, in response to executing a second virtual machine (VM) instance on the computer, a second code cache associated with the second VM instance, wherein the computer further comprises a second virtual memory space;
    assigning the second virtual memory space to the second code cache;

obtaining, from the second VM instance, the persistent storage location;
determining that the mappable data structure exists at the persistent storage location;
determining that the mappable data structure is compatible with the second VM instance; and
mapping, in response to the determining that the mappable data structure is compatible with the second VM instance, the mappable data structure into the second virtual memory space.

9. The machine readable storage medium of claim 8, wherein determining that the mappable data structure is compatible with the second VM instance comprises:
obtaining a first set of information associated with the mappable data structure;
obtaining a second set of information associated with the second VM instance; and
comparing the first set of information to the second set of information to obtain an indication that the mappable data structure is compatible with the second VM instance.

10. The machine readable storage medium of claim 8, wherein storing the mappable data structure comprises:
obtaining a set of information associated with the first VM instance; and
storing the set of information with the mappable data structure.

11. The machine readable storage medium of claim 8, wherein the set of instructions causes the one or more processors to further perform the following operation:
providing component reference information to the second VM instance to enable the second VM instance to invoke the first compiled code, wherein the component reference information includes information identifying the first component, and a reference to the first compiled code.

12. The machine readable storage medium of claim 11, wherein the set of instructions causes the one or more processors to further perform the following operation:
processing the mappable data structure to derive the component reference information therefrom.

13. The machine readable storage medium of claim 8, wherein the first VM instance is a Java virtual machine (JVM), and wherein the component-is a Java method.

14. An apparatus, comprising:
a persistent storage;
one or more processors;
a first virtual memory space;
a second virtual memory space;
a physical memory; and
a set of instructions, which when executed by the one or more processors, causes the one or more processors to perform the following operations:
initializing, in response to executing a first virtual machine (VM) instance on the apparatus, a first code cache associated with the first VM instance;
assigning the first virtual memory space to the first code cache;
obtaining, from the first VM instance, a persistent storage location;
determining that a mappable data structure does not exist at the persistent storage location;
obtaining, in response to the determining that the mappable data structure does not exist, a first component associated with the first VM instance and a second component associated with the first VM instance;
compiling the first component to obtain first compiled code stored in the first virtual memory space;
compiling the second component to obtain second compiled code stored in the first virtual memory space;
creating, at the persistent storage location, the mappable data structure;
storing the first compiled code and the second compiled code in the mappable data structure;
initializing, in response to executing a second virtual machine (VM) instance on the apparatus, a second code cache associated with the second VM instance;
assigning the second virtual memory space to the second code cache;
obtaining, from the second VM instance, the persistent storage location;
determining that the mappable data structure exists at the persistent storage location;
determining that the mappable data structure is compatible with the second VM instance; and
mapping, in response to the determining that the mappable data structure is compatible with the second VM instance, the mappable data structure into the second virtual memory space.

15. The apparatus of claim 14, determining that the mappable data structure is compatible with the second VM instance comprises:
obtaining a first set of information associated with the mappable data structure;
obtaining a second set of information associated with the second VM instance; and
comparing the first set of information to the second set of information to obtain an indication that the mappable data structure is compatible with the second VM instance.

16. The apparatus of claim 14, wherein storing the mappable data structure comprises:
obtaining a set of information associated with the first VM instance; and
storing the set of information with the mappable data structure.

17. The apparatus of claim 14, wherein the set of instructions caused the one or more processors to further perform the following operation:
providing component reference information to the second VM instance to enable the second VM instance to invoke the first compiled code, wherein the component reference information includes information identifying the first component, and a reference to the first compiled code.

18. The apparatus of claim 17, wherein the set of instructions causes the one or more processors to further perform the following operation:
processing the mappable data structure to derive the component reference information therefrom.

19. The apparatus of claim 14, wherein the first VM instance is a Java virtual machine (JVM), and wherein the component-is a Java method.

\* \* \* \* \*